United States Patent [19]

Semchena et al.

[11] Patent Number: 5,251,931
[45] Date of Patent: Oct. 12, 1993

[54] SAFETY APPARATUS

[75] Inventors: John H. Semchena, Royal Oak; Ernst M. Faigle; Richard J. Thompson, both of Imlay, all of Mich.

[73] Assignee: TRW Vehicle Safety Systems Inc., Lyndhurst, Ohio

[21] Appl. No.: 851,981

[22] Filed: Mar. 9, 1992

[51] Int. Cl.⁵ .............................................. B60R 21/22
[52] U.S. Cl. .................................. 280/730; 297/216.1
[58] Field of Search ........... 280/728, 730, 743, 728 A, 280/728 B, 730 A; 297/216, DIG. 3

[56] References Cited

U.S. PATENT DOCUMENTS

| | | | |
|---|---|---|---|
| 2,834,606 | 5/1958 | Bertrand . | |
| 3,897,961 | 8/1975 | Leising et al. . | |
| 3,953,049 | 4/1976 | Surace et al. | 280/730 |
| 4,946,191 | 8/1990 | Putsch | 280/730 |
| 4,966,388 | 10/1990 | Warner et al. | 280/730 |
| 5,033,236 | 7/1991 | Szerdahelyi et al. | 49/502 |
| 5,052,065 | 10/1991 | West | 280/730 |
| 5,112,079 | 5/1992 | Haland et al. | 280/730 |
| 5,149,165 | 9/1992 | Wolley | 297/216 |

FOREIGN PATENT DOCUMENTS

| | | | |
|---|---|---|---|
| 0281455 | 12/1991 | Japan | 280/728 |
| 0281458 | 12/1991 | Japan | 280/730 |
| 2218698 | 11/1989 | United Kingdom | 280/736 |

Primary Examiner—Margaret A. Focarino
Assistant Examiner—Paul Dickson
Attorney, Agent, or Firm—Tarolli, Sundheim & Covell

[57] ABSTRACT

A safety apparatus includes an air bag 32 which is inflatable to an extended condition disposed between a hip 38 of a person 12 seated on a vehicle seat 14 and a door 16 of the vehicle. An inflator assembly 22 provides gas to inflate the air bag. The inflator assembly 22 and the air bag 32 are mounted on the vehicle seat 14 for movement with the vehicle seat relative to the body of the vehicle.

5 Claims, 2 Drawing Sheets

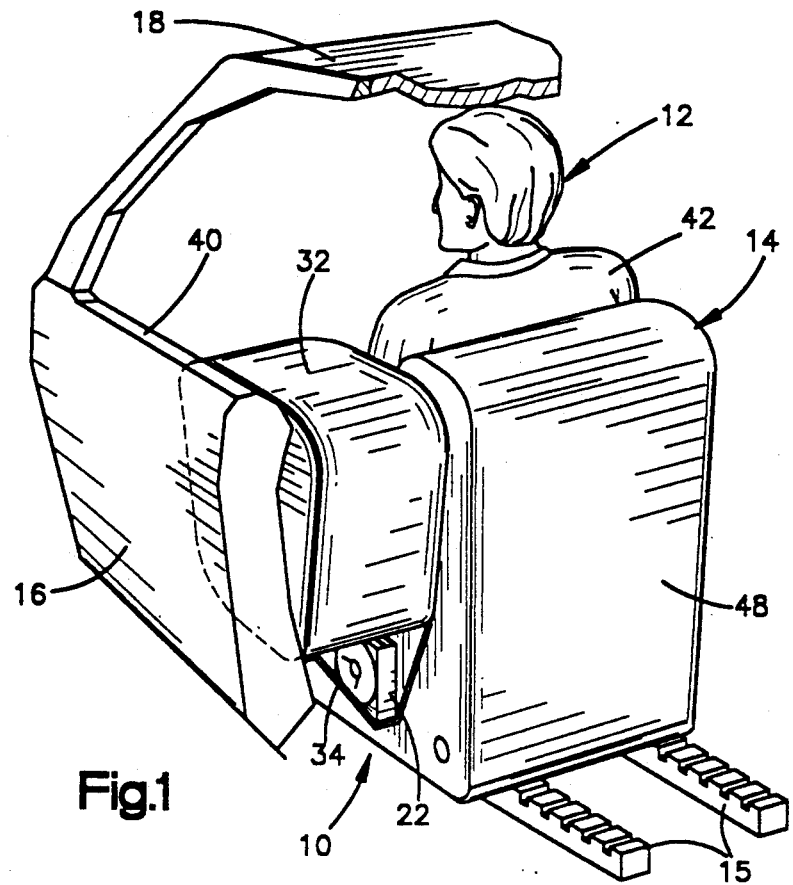
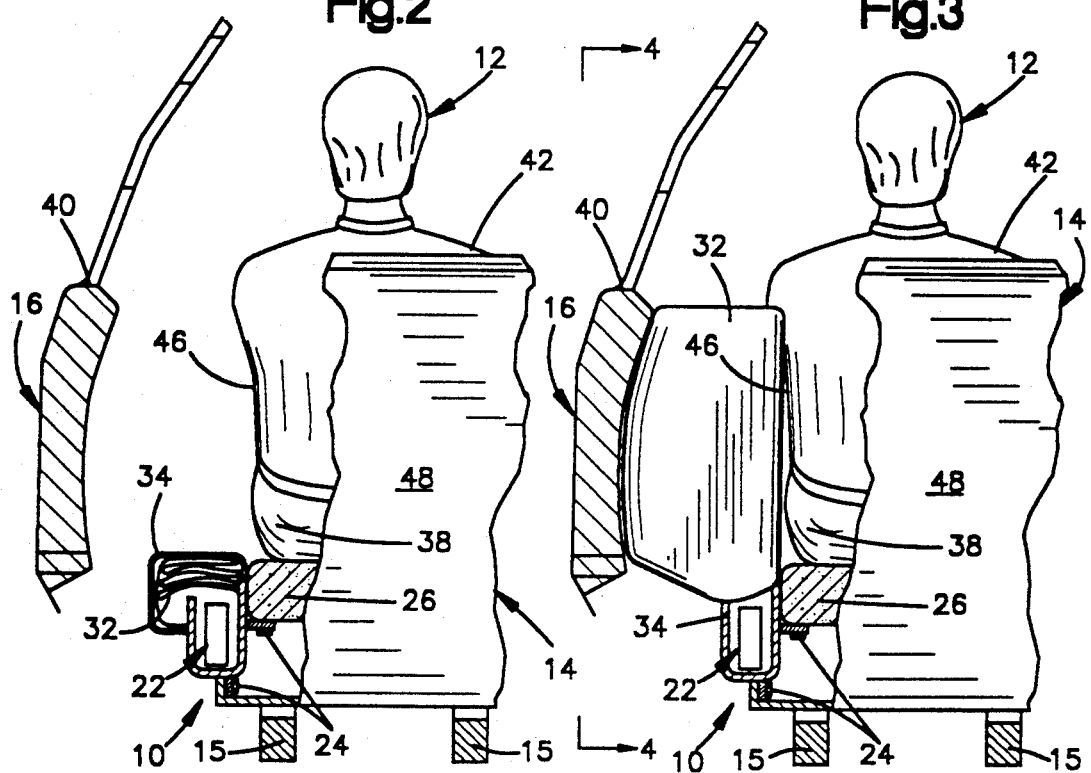

SAFETY APPARATUS

BACKGROUND OF THE INVENTION

The present invention relates to a vehicle safety apparatus, and particularly relates to a vehicle safety apparatus having an air bag which is inflatable to restrain movement of a person seated in a vehicle.

A known safety apparatus includes an air bag which is inflated to restrain movement of a person seated in a vehicle. Typically, the air bag is stored either in the steering wheel of the vehicle or in the instrument panel of the vehicle. Upon the occurrence of sudden vehicle deceleration such as occurs in a collision, the air bag is inflated from a storage condition to an extended condition.

In order further to protect a person seated in a vehicle, it has been suggested that an air bag for restraining sideward movement of the person could be mounted on the door of the vehicle. Upon the occurrence of a collision, the air bag is extended from the door of the vehicle to a location between the person and the door. When an air bag is mounted on the door of the vehicle, the air bag must extend along the door of the vehicle for a distance sufficient to have a portion of the air bag between the door and the person seated in the vehicle throughout a range of adjusting movement of the seat. Arrangements for mounting air bags on the door of a vehicle are disclosed in U.S. Pat. Nos. 4,966,388 and 5,033,236.

In a further effort to protect a person seated in a vehicle, it has been suggested that an air bag be provided in a forwardly projecting side wing on the back of a vehicle seat. Upon the occurrence of a collision, the air bag is inflated to protect the head of the person. Such a safety apparatus is disclosed in U.S. Pat. No. 4,946,191.

SUMMARY OF THE INVENTION

The present invention provides a new and improved safety apparatus for restraining sideward movement of a person seated on a vehicle seat in the event of sudden vehicle deceleration, such as occurs during a vehicle collision. The safety apparatus includes an air bag which is inflatable from a storage condition to an extended condition. An inflator assembly provides gas to inflate the air bag from the storage condition to the extended condition. The inflator assembly and the air bag are mounted on the vehicle seat. The vehicle seat is movable relative to the body of the vehicle, and thus the inflator assembly and air bag move with the vehicle seat relative to the body of the vehicle. When inflated, the air bag extends between a hip of a person seated on the vehicle seat and the door of the vehicle.

The inflator assembly and air bag may be mounted on the seat of the vehicle at a level below the hip of a person seated on the seat. When the air bag is in the extended condition, the air bag may extend upwardly from a level below the hip of a person seated on the seat of the vehicle to a location adjacent to the shoulders of the person seated on the seat.

Also, if desired, the inflator assembly could include two sources of fluid. Specifically, a first source of fluid could be mounted on the seat of the vehicle at a level below the hip of a person seated on the seat and a second source of fluid could be mounted on the seat of the vehicle at a level above the hip of the person seated on the seat.

BRIEF DESCRIPTION OF THE DRAWINGS

The foregoing and other features of the present invention will become apparent to one skilled in the art to which the present invention relates upon a consideration of the following description of the invention with reference to the accompanying drawings, wherein:

FIG. 1 is a schematic pictorial illustration depicting a person seated on a seat of a vehicle and an inflated air bag disposed between a hip of the person and a door of the vehicle;

FIG. 2 is a schematic illustration depicting the air bag of FIG. 1 when the air bag is in a storage condition;

FIG. 3 is a schematic illustration, generally similar to FIG. 2, illustrating the air bag in an inflated condition;

DESCRIPTION OF EMBODIMENTS OF THE INVENTION

Figure 4:
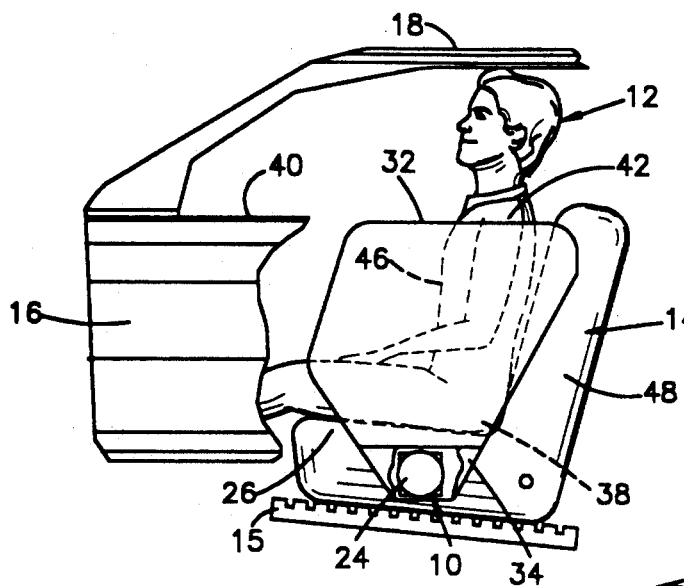
FIG. 4 is a schematic side elevational view, taken generally along the line 4—4 of FIG. 3, with parts broken away.

A safety apparatus 10 (FIG. 1) is provided to restrain movement of a person 12 seated on a seat 14 of a vehicle in the event of sudden vehicle deceleration, such as occurs during a collision. The seat 14 is movable forwardly and rearwardly along tracks 15 relative to a door 16 and body 18 of the vehicle. The safety apparatus 10 is mounted on the seat 14 for movement with the seat relative to the door 16 and body 18 of the vehicle.

The safety apparatus 10 includes an air bag 32 and an inflator assembly 22 which contains a source of gas for inflating the air bag. The inflator assembly 22 is mounted on a lower portion of the frame of the seat 14 by bolts 24. The inflator assembly 22 is disposed at a level which is lower than the upper side of a seat cushion 26. Since the inflator assembly 22 is mounted on the lower portion of the seat 14, the position of the inflator assembly remains constant relative to the person 12 seated on the seat when the position of the seat is adjusted relative to the body 18 and door 16 of the vehicle. Although the inflator assembly 22 could have many different constructions, it is contemplated that the inflator assembly may be constructed in a manner similar to that disclosed in U.S. Pat. Nos. 4,902,036 and 4,907,819.

The air bag 32 is mounted on the lower portion of the frame of the seat 14 along with the inflator assembly 22. When the air bag 32 is in the storage condition shown in FIG. 2, the air bag is folded into a compact unit which is disposed adjacent to the inflator assembly 22. The folded air bag 32 is protected by a rigid plastic housing 34. The rigid plastic housing 34 stores the folded air bag 32 at a level below the upper, generally horizontal surface of the seat cushion 26. The housing 34 has pre-weakened seams which, upon initiation of inflation of the air bag 32, rupture in a predetermined manner to direct the air bag upward and outward against the door 16.

In the event of sudden vehicle deceleration, such as occurs in a collision, a sensor senses the deceleration and actuates the inflator assembly 22. The inflator assembly 22 directs gas into the air bag 32 to inflate the air bag. As the air bag 32 is inflated by a flow of gas from the inflator assembly 22, the air bag inflates upward and outward toward the door 16 from a position below the hip 38 of a person seated on the seat 14. The inflating air bag 32 contacts the door 16 and moves along the door into the space between the hip 38 of the occupant 12 of the vehicle and the door.

The inflated air bag restrains sideward movement of the person in the seat 14 and thus protects the person from striking the door of the vehicle. The air bag 32, when in its inflated or extended condition shown in FIG. 3, substantially fills the space between the door 16 and the hip 38 of the person on the seat 14. In the embodiment of FIGS. 1-4, the inflated air bag 32 also extends upward to a location immediately beneath the lower edge of a window opening 40 formed in the door 16. The upper portion of the air bag 32 is disposed adjacent to a shoulder 42 of the person 12 seated on the seat 14. Also, the inflated air bag extends forward for a sufficient distance to restrain sideward movement of the occupant even though the torso 46 (FIG. 4) of the occupant of the vehicle moves forward relative to the backrest 48 of the seat 14 under the influence of inertial forces due to sudden vehicle deceleration.

In the embodiment of the invention illustrated in FIGS. 1-4, the safety apparatus 10 includes a single inflator assembly 22. However, it is contemplated that a plurality of inflator assemblies could be utilized, if desired, to provide a plurality of sources of fluid for inflating the air bag. In the embodiment of the invention illustrated in FIG. 5, two inflator assemblies are utilized to provide a pair of sources of fluid for inflating the air bag. Since the embodiment of the invention illustrated in FIG. 5 is generally similar to the embodiment of the invention illustrated in FIGS. 1-4, similar numerals will be utilized to designate similar components, the suffix letter "a" being added to the components of the invention illustrated in FIG. 5 in order to avoid confusion.

Figure 5:
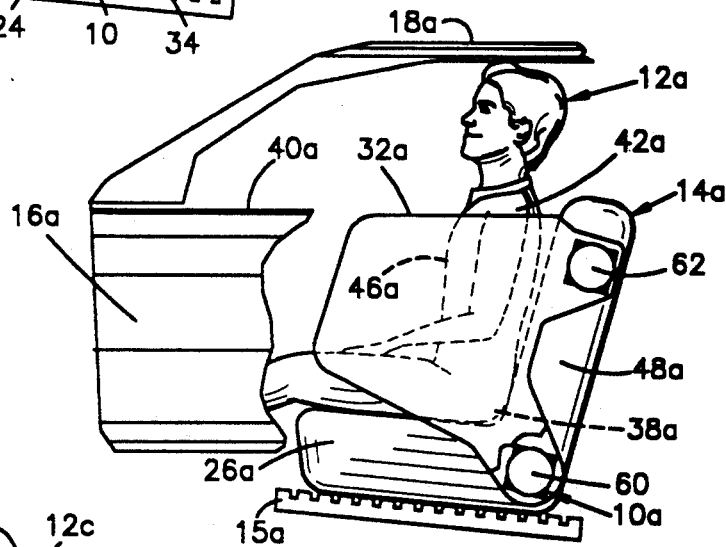
FIG. 5 is a schematic side elevational view, generally similar to FIG. 4, of a second embodiment of the invention.

In the embodiment of the invention illustrated in FIG. 5, the safety apparatus 10a includes a pair of inflator assemblies 60 and 62. The inflator assembly 60 is connected with the lower portion of the frame of the seat 14a by bolts or other suitable connectors. The inflator assembly 60 is mounted on the seat 14a at a level below the hip 38a of the person 12a seated on the seat 14a.

The inflator assembly 62 is mounted on the backrest 48a of the seat 14a at a level just below the shoulder 42a of the person 12a disposed on the seat 14a. The inflator assembly 62 is secured to the frame of the seat 14a by bolts or other suitable connectors. The inflator assemblies 60 and 62 move with the seat 14a when the position of the seat is adjusted along rails 15a. The inflator assemblies 60 and 62 may have a construction similar to that disclosed in U.S. Pat. Nos. 4,902,036 and 4,907,819.

In the event of sudden vehicle deceleration, the inflator assemblies 60 and 62 both provide fluid for inflating the air bag 32a. When the air bag 32a is inflated, it moves forward toward the front of the vehicle and outward against the door 16a of the vehicle. Continued inflation of the air bag results in the air bag inflating along the door 16a. When the air bag 32a is fully inflated, it extends forward of the torso 46a of the person 12a disposed on the seat 14a. The inflated air bag 32a is disposed between a hip 38a of the person 12a disposed on the seat 14a and the door 16a of the vehicle to restrain movement of the person 12a toward the door 16a of the vehicle.

In the embodiments of the invention illustrated in FIGS. 1-5, the inflator assemblies are mounted along the sides of the seats. However, it is contemplated that one or more inflator assemblies could be mounted beneath the seat if desired. In the embodiment of the invention illustrated in FIG. 6, an inflator assembly is mounted beneath the seat. Since the embodiment of the invention illustrated in FIG. 6 is generally similar to the embodiments of the invention illustrated in FIGS. 1-5, similar numerals will be utilized to designate similar components, the suffix letter "c" being added to the components of the invention illustrated in FIG. 6 to avoid confusion.

Figure 6:
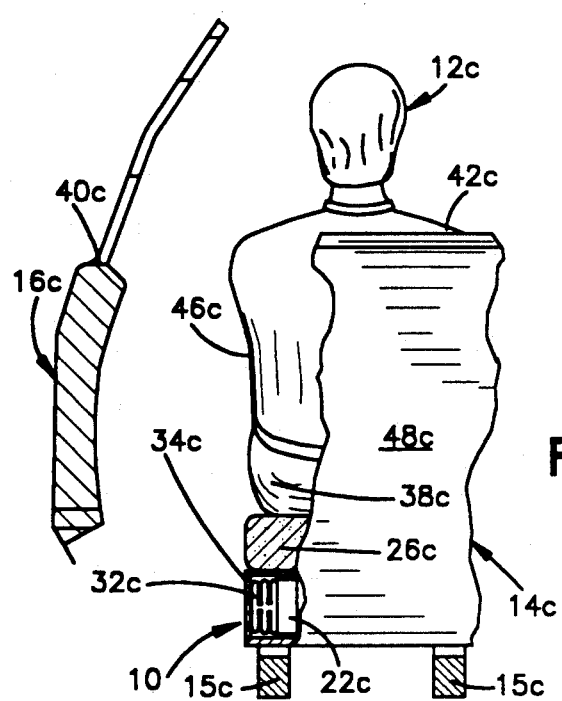
FIG. 6 is a schematic illustration, generally similar to FIG. 2, of a third embodiment of the invention.

In the embodiment of the invention illustrated in FIG. 6, the air bag 32c is mounted beneath the seat 14c along with the inflator assembly 22c. When the air bag 32c is in the storage condition shown in FIG. 6, the air bag is folded into a compact unit which is disposed beneath the seat 14c adjacent to the inflator assembly 22c. The folded air bag 32c is protected by a rigid plastic housing 34c. The rigid plastic housing 34c stores the folded air bag 32c below the seat cushion 26c. The housing 34c, air bag 32c and inflator assembly 22c all move with the seat 14c along the rails 15c.

In the event of sudden vehicle deceleration, such as occurs in a collision, a sensor senses the deceleration and actuates the inflator assembly 22c. The inflator assembly 22c directs gas into the air bag 32c to inflate the air bag. As the air bag 32c is inflated by a flow of gas from the inflator assembly 22c, the air bag inflates upward and outward toward the door 16c from a position beneath the seat 14c. The inflating air bag 32c contacts the door 16c and moves along the door into the space between the hip 38c of the occupant 12c of the vehicle and the door.

From the above description of the invention, those skilled in the art will perceive improvements, changes and modifications. Such improvements, changes and modifications within the skill of the art are intended to be covered by the appended claims.

Having described the invention, the following is claimed:

1. A safety apparatus for cushioning a person seated on a vehicle seat which is movable relative to a body of a vehicle, the vehicle seat having a back cushion portion and a bottom cushion portion, said safety apparatus comprising:

an air bas which is inflatable from a storage condition to an extended condition, said air bag having means for extending between a hip of the person seated on the vehicle seat and the door of the vehicle when said air bag is in its extended condition;

first inflator means for providing gas to inflate the air bag from the storage condition to the extended condition; and means for mounting said air bag and said first inflator means on the vehicle seat and entirely beneath the bottom cushion portion of the vehicle seat for movement with the vehicle seat relative to the body of the vehicle.

2. An apparatus as set forth in claim 1 wherein said first inflator means includes means for effecting initial inflation of said air bas toward the vehicle door from the storage condition.

3. An apparatus as set forth in claim 1 wherein an upper end portion of said air bag is disposed at a level below the lower edge portion of a window opening formed in the door when said air bag is in the extended condition.

4. An apparatus as set forth in claim 1 wherein said air bag extends upward from a level below the hip of a person seated on the seat of the vehicle to a location adjacent to the shoulders of a person seated on the seat of the vehicle when said air bag is in the extended condition.

5. A safety apparatus for cushioning a person seated n a vehicle seat which is movable relative to a body of a vehicle, the vehicle seat having a back cushion portion and a bottom cushion portion, said safety apparatus comprising:

an air bag which is inflatable from a storage condition to an extended condition, said air bag having means for extending between a hip of the person seated on the vehicle seat and the door of the vehicle when said air bag is in its extended condition;

first inflator means for providing gas to inflate the air bag from the storage condition to the extended condition; and means for mounting said first inflator means on the vehicle seat and entirely beneath the bottom cushion portion of the vehicle seat for movement with the vehicle seat relative to the body of the vehicle.

* * * * *

UNITED STATES PATENT AND TRADEMARK OFFICE
CERTIFICATE OF CORRECTION

PATENT NO. : 5,251,931
DATED : October 12, 1993
INVENTOR(S) : John H. Semchena, Ernst M. Faigle, and Richard J. Thompson It is certified that error appears in the above-indentified patent and that said Letters Patent is hereby corrected as shown below:

Column 4, line 47, change "bas" to --bag--.

Column 5, line 7, change "n" to --on--.

Signed and Sealed this

Fifth Day of April, 1994

Attest:

BRUCE LEHMAN

Attesting Officer     Commissioner of Patents and Trademarks